(12) United States Patent
Arroyo et al.

(10) Patent No.: US 9,141,493 B2
(45) Date of Patent: *Sep. 22, 2015

(54) ISOLATING A PCI HOST BRIDGE IN RESPONSE TO AN ERROR EVENT

(71) Applicant: International Business Machines Corporation, Armonk, NY (US)

(72) Inventors: Jesse P. Arroyo, Rochester, MN (US); Srinivas Kotta, Hyderabad (IN); Anjam Kumar Guttahalli Krishna, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 137 days.

This patent is subject to a terminal disclaimer.

(21) Appl. No.: 13/940,757

(22) Filed: Jul. 12, 2013

(65) Prior Publication Data
US 2015/0019903 A1    Jan. 15, 2015

(51) Int. Cl.
*G06F 11/00* (2006.01)
*G06F 11/20* (2006.01)
*G06F 13/40* (2006.01)
*G06F 11/14* (2006.01)

(52) U.S. Cl.
CPC ........ *G06F 11/2069* (2013.01); *G06F 11/1441* (2013.01); *G06F 11/2002* (2013.01); *G06F 11/2007* (2013.01); *G06F 13/405* (2013.01); *G06F 13/4022* (2013.01); *G06F 13/4027* (2013.01)

(58) Field of Classification Search
CPC .............. G06F 11/2002; G06F 11/141; G06F 11/1658; G06F 11/2033; G06F 11/2038; G06F 11/2041; G06F 11/2056; G06F 11/2064; G06F 11/2082; G06F 13/20; G06F 13/36; G06F 13/4027; G06F 13/405; G06F 13/4221
See application file for complete search history.

(56) References Cited

U.S. PATENT DOCUMENTS

| | | | |
|---|---|---|---|
| 5,872,998 | A | 2/1999 | Chee |
| 6,112,311 | A | 8/2000 | Beardsley et al. |
| 6,202,115 | B1 * | 3/2001 | Khosrowpour ............... 710/312 |

(Continued)

FOREIGN PATENT DOCUMENTS

JP          2009169854 A       7/2009

OTHER PUBLICATIONS

IBM, Self Healing Server I/O Connectivity Design: An IP.com Prior Art Database Technical Disclosure, ip.com, Apr. 29, 2005, <http://ip.com/IPCOM/000124597>.

(Continued)

*Primary Examiner* — Joseph Kudirka
(74) *Attorney, Agent, or Firm* — Patterson & Sheridan, LLP (57) ABSTRACT

Instead of disabling PCI communication between system resources in a host computing device and I/O devices when a PCI Host Bridge (PHB) is unable to function, the host computing device may include a redundant PCI communication path for maintaining communication between the system resources and the I/O devices after a first PHB experiences an unrecoverable error. In one embodiment, the redundant PCI communication path includes a second PHB that is maintained in a standby state so long as the first PHB is functioning normally. However, once the first PHB experiences an unrecoverable error, the second PHB is changed to the master state and assumes the responsibility for maintaining communication between the system resources and the I/O devices.

13 Claims, 4 Drawing Sheets

(56) References Cited

U.S. PATENT DOCUMENTS

| | | |
|---|---|---|
| 6,708,283 B1 * | 3/2004 | Nelvin et al. ............ 714/5.11 |
| 6,732,243 B2 * | 5/2004 | Busser et al. ............... 711/162 |
| 6,886,107 B2 * | 4/2005 | Walsh et al. ............. 714/4.12 |
| 6,920,519 B1 | 7/2005 | Beukema et al. |
| 7,093,043 B2 | 8/2006 | Tan et al. |
| 7,370,224 B1 | 5/2008 | Jaswa et al. |
| 7,610,509 B2 * | 10/2009 | Abe .............................. 714/11 |
| 7,925,817 B2 | 4/2011 | Uehara et al. |
| 2002/0184576 A1 | 12/2002 | Arndt et al. |
| 2003/0065861 A1 * | 4/2003 | Clark et al. .................. 710/305 |
| 2009/0276605 A1 | 11/2009 | Arndt et al. |
| 2012/0144230 A1 | 6/2012 | Buckland et al. |
| 2015/0095700 A1 | 4/2015 | Arroyo et al. |
| 2015/0127969 A1 | 5/2015 | Arroyo et al. |
| 2015/0127971 A1 | 5/2015 | Arroyo et al. |

OTHER PUBLICATIONS

IBM, Transparent addressing mechanism in a redundant network: An IP.com Prior Art Database Technical Disclosure, ip.com, Jan. 7, 2003, <http://ip.com/IPCOM/000010657>.

John Gudmundson, "Enabling Multi-Host System Designs with OCI Express Technology," PCI Express, Reprinted from RTC, May 2004.

Akber Kzami, "PCI Express and Non-Transparent Bridging Support High Availability," Reprinted from Embedded Computing Design, Winter 2004.

* cited by examiner

ISOLATING A PCI HOST BRIDGE IN RESPONSE TO AN ERROR EVENT

BACKGROUND

The present invention relates to providing redundant data communication paths in a peripheral component interconnect (PCI) link, and more specifically, to activating a standby PCI host bridge when a master PCI host bridge experiences an error.

An unrecoverable or fatal error in a PCI host bridge indicates that the PCI host bridge may be corrupt and cannot recover or continue operation. When such an error is detected, a host computing device may perform a reset as part of an error recovery process on the PCI host bridge. However, while recovering from the error, the PCI host bridge may be taken offline. As a result, the I/O devices (i.e., peripheral devices) that rely on the PCI host bridge to facilitate PCI communication with the host computing device may be communicatively disconnected from the host computing device. In some instances, the PCI host bridge may require tens of seconds to perform the error recovery process until PCI communication between the I/O devices and the host is restored. This downtime may negatively affect a computing system's performance and availability.

SUMMARY

Embodiments described herein include a method and a computer program product for handling an event in a PCI host bridge (PHB). The method and computer program product include synchronizing a first PHB to a second PHB such that settings of the first PHB are mirrored onto the second PHB where the first PHB is configured to facilitate PCI communication between a host and an I/O device. The method and computer program product include detecting an event on the first PHB indicating that the functionality of the first PHB is inhibited. After detecting the event, the method and computer program product include changing a state of the second PHB from a standby state to a master state where the second PHB is configured to facilitate PCI communication between the host and the I/O device. The method and computer program product include resetting the first PHB and, after detecting the event, changing a state of the first PHB from the master state to the standby state.

Another embodiment described herein includes a computing system. The computing system includes a computer processor and a first PHB configured to facilitate PCI communication between the processor and an I/O device, the first PHB is configured to reset after detecting an event indicating that the first PHB is unable to function. The computing system including a second PHB configured to, after receiving a notification that the functionality of the first PHB is inhibited, change from a standby state to a master state, wherein the second PHB is configured to facilitate PCI communication between the I/O device and the processor. The computing system further includes a communication path between the first and second PHBs for synchronizing the first PHB to the second PHB such that settings of the first PHB are mirrored onto the second PHB.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

A PCI host bridge (PHB) that experiences an error where the PHB cannot recover on its own or continue operation may reset in order to restart operation. To initiate the error recovery process, the PHB may isolate itself from the other system resources operating in the host computing device. Isolating the PHB, however, may prevent transactions sent from the system resources (e.g., Virtual Machines, Operating Systems, etc.) to reach I/O devices coupled to the PHB via a PCI link. That is, the system resources may lose connectivity to the I/O devices. In addition to isolating itself from the other system resources in the host computing device, the PHB may freeze the I/O devices that rely on the PHB to communicate with the system resources within the host computing device. For example, the PHB may cause the I/O devices to switch to a pause or stop state (e.g., a memory mapped input-output (MMIO) stopped state or direct memory access (DMA) stopped state) while the PHB performs the error recovery process. The PHB may inform a supervisory system in the host computing device (e.g., a hypervisor) that an unrecoverable error has occurred. The hypervisor may then inform the system resources coupled to the PHB and reset the PHB such that the hardware or firmware associated with the PHB is reinitialized. Once the PHB is reinitialized, the supervisory system informs the system resources that they are now able to reconnect and communicate with the I/O devices.

Performing the technique discussed above may require many seconds to complete. During this time, however, the system resources in the host computing device are unable to communicate with the I/O devices. This downtime can affect system performance, especially in systems that have stringent high-availability requirements. Instead of disabling communication between the system resources in a host computing device and I/O devices, the host computing device may include a redundant PCI communication path for maintaining communication between the system resources and the I/O devices after a first PHB experiences an unrecoverable error. In one embodiment, the redundant PCI communication path includes a second PHB that is maintained in a standby state so long as the first PHB is functioning normally. However, once the first PHB experiences an unrecoverable error, the second PHB is changed to the master state and assumes the responsibility for maintaining communication between the system resources and the I/O devices.

In one embodiment, the first and second PHBs may share a communication link that allows the two PHBs to synchronize. Namely, the routing data contained in the first PHB may constantly, or at intervals, be transferred to the second PHB using the communication link. Accordingly, once the first PHB experiences the unrecoverable error and can no longer facilitate communication between the host device and the I/O devices, the second PHB is already configured with the necessary routing information to assume the responsibility as the master. Once reinitialized, the state of the first PHB may be changed to standby, thereby indicating that the first PHB is ready to reassume the role as master if the second PHB experiences an unrecoverable error.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
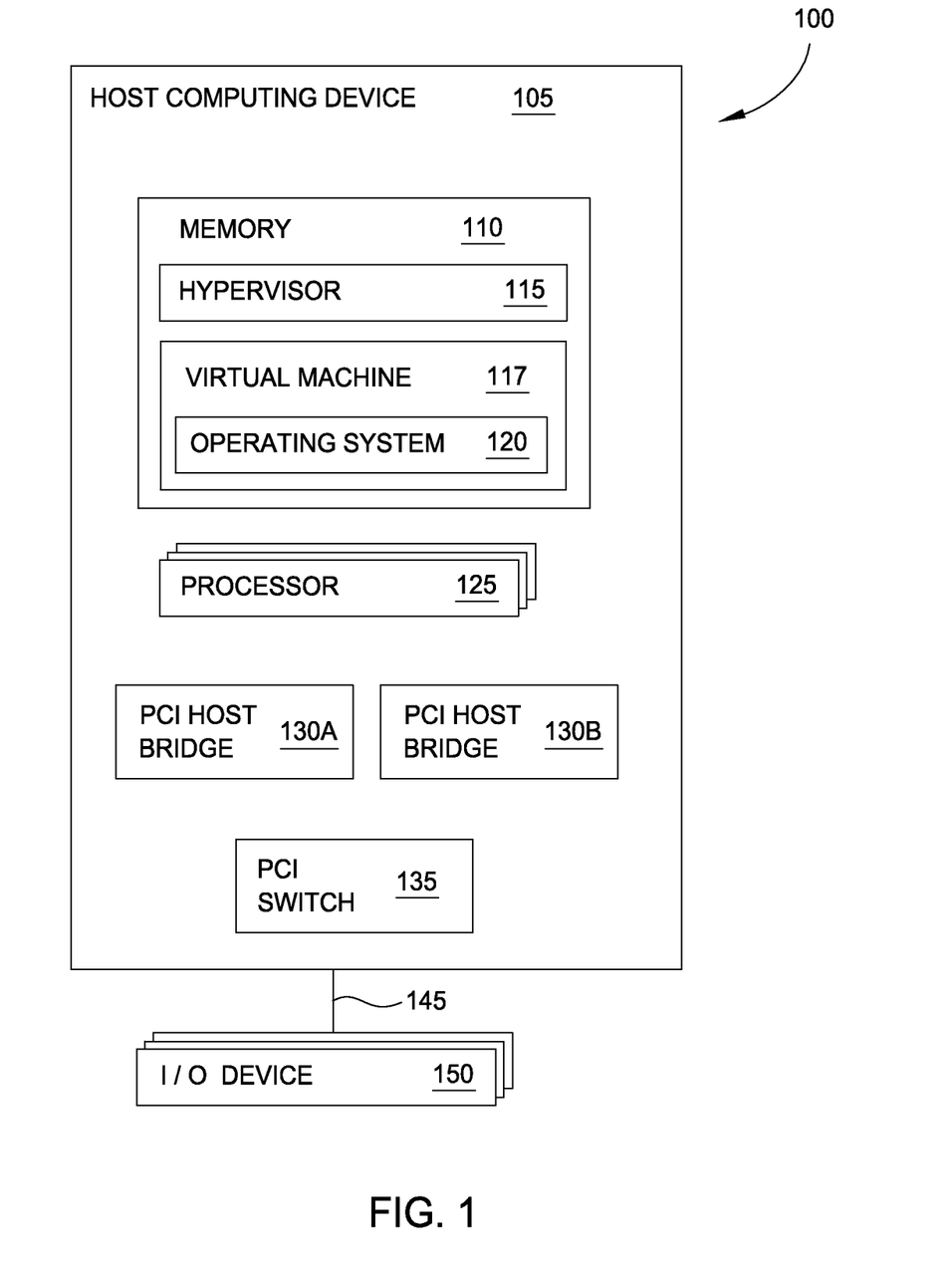
FIG. 1 illustrates a system diagram of a computing device with at least one PCI communication link to an I/O device, according to one embodiment described herein.

FIG. 1 illustrates a system diagram of a computing device with at least one PCI communication link to an I/O device, according to one embodiment described herein. System 100 includes a host computing device 105 coupled via one or more PCI links 145 to one or more I/O devices 150. As used herein, PCI refers to conventional PCI, PCI Express, or any variant thereof. Moreover, the PCI link 145 may represent a single PCI link that is shared by multiple I/O devices 150 or individual PCI links for each one of the I/O devices 150.

Host computing device 105 includes a memory 110, one or more processors 125, at least two PHBs 130A-B, and a PCI switch 135. Memory 110 may include volatile memory element, non-volatile memory elements, or a combination of both. For example, memory 110 may include both RAM and a hard disk drive which are used in combination to store data associated with host computing device 105. Here, memory 110 stores a hypervisor 115 and at least one virtual machine 117 executing on the host computing device 105. For example, host computing device 105 may be a server whose hardware is used to host a plurality of virtual machines 117. In one embodiment, the host computing device 105 uses the hypervisor 115 to manage and configure the various virtual machines 117. Although the hypervisor 115 is shown as software, in other embodiments, hypervisor 115 may be implemented using firmware or hardware.

In one embodiment, virtual machine 117 is a software implemented abstraction of the underlying hardware in the host computing device 105. As such, each virtual machine 117 may provide a complete system platform which supports the execution of an operating system 120. However, the advantages and details of using and implementing virtual machines 117 will not be discussed in detail here.

The various system resources in the host computing device 105—e.g., virtual machine 117, operating system 120, processor 125, and the like—may communicate with the I/O devices 150 using the PCI link 145. For example, virtual machines 117 may use the I/O devices 150 to expand their capabilities such as providing additional storage (e.g., memory cards or disk drives), specialized processing (e.g., video cards), specialized function (e.g., wireless cards), and the like. Further still, in one embodiment, the I/O devices 150 may be owned or assigned to a particular system resource. For example, each virtual machine 117 may be assigned a specific I/O device 150, or the memory space in an I/O device 150 may be separated into a plurality of partitions where each partition is assigned to a specific virtual machine 117. Although virtual machines 117 and processors 125 are examples of system resources in host computing device 105 that may communicate with the I/O devices 150, the embodiments described herein are not limited to such.

To facilitate communication between the system resources and the I/O devices 150, host computing device 105 includes PHBs 130A-B and a PCI switch 135. Generally, the PHBs 130A-B may provide an interface between PCI communication and a communication method used to transfer data within host computing device 105. For example, host computing device 105 may transfer data internally using a system bus and a parallel data communication method while some embodiments of PCI use serial communication to transmit data to the I/O devices 150. The PHBs 130 may serve as an intermediary between these two communication techniques. Moreover, PHBs 130 may perform memory translations between the memory space in the I/O devices 150 and memory 110 of the host computing device 105. As such, each PHB 130 may include a first interface that couples to a bus of the host computing device 105 (e.g., an ASIC interconnect bus) and a second interface that couples to the PCI switch 135. Although only two PHBs 130 are shown in system 100, in other embodiments it may be desirable to have more than two PHBs 130 for additional redundancy.

In one embodiment, the PHBs 130 are hardware units (e.g., ASICs) mounted in the host computing device 105. Although not shown, the PHBs 130 may include firmware or software that controls and monitors the functions of the PHBs 130. Specifically, the firmware or software associated with the PHBs 130 may include routing information and/or memory translation information that permits the PHBs 130 to route requests from system resources in the host computing device 105 to the appropriate I/O device 150, and vice versa. Specifically, the PHBs 130 may use PCI switch 135 to communicate with I/O devices 150. As such, the PCI switch 135 may also contain routing information for determining which I/O device 150 is the appropriate destination Like the PHBs 130, the PCI switch 135 may also be a hardware element which may be controlled using associated firmware or software.

In one embodiment, PHBs 130 in system 100 may be used to establish a redundant communication path. Specifically, PHBs 130 may be configured in a master-servant relationship where one of the PHBs 130 is the master (i.e., is currently facilitating data traffic between the I/O devices 150 and the system resources in the host computing device 105) while the other PHB 130 is the servant (i.e., is on standby). However, as will be discussed in greater detail below, if the master PHB 130 experiences an error which forces it to be taken offline, the servant PHB 130 may be promoted to the master PHB 130 thereby maintaining the data flow between the system resources and the I/O devices 150. The embodiments described herein may be used to shorten downtime and minimize data loss compared to a system 100 where only one PHB 130 is used.

Figure 2:
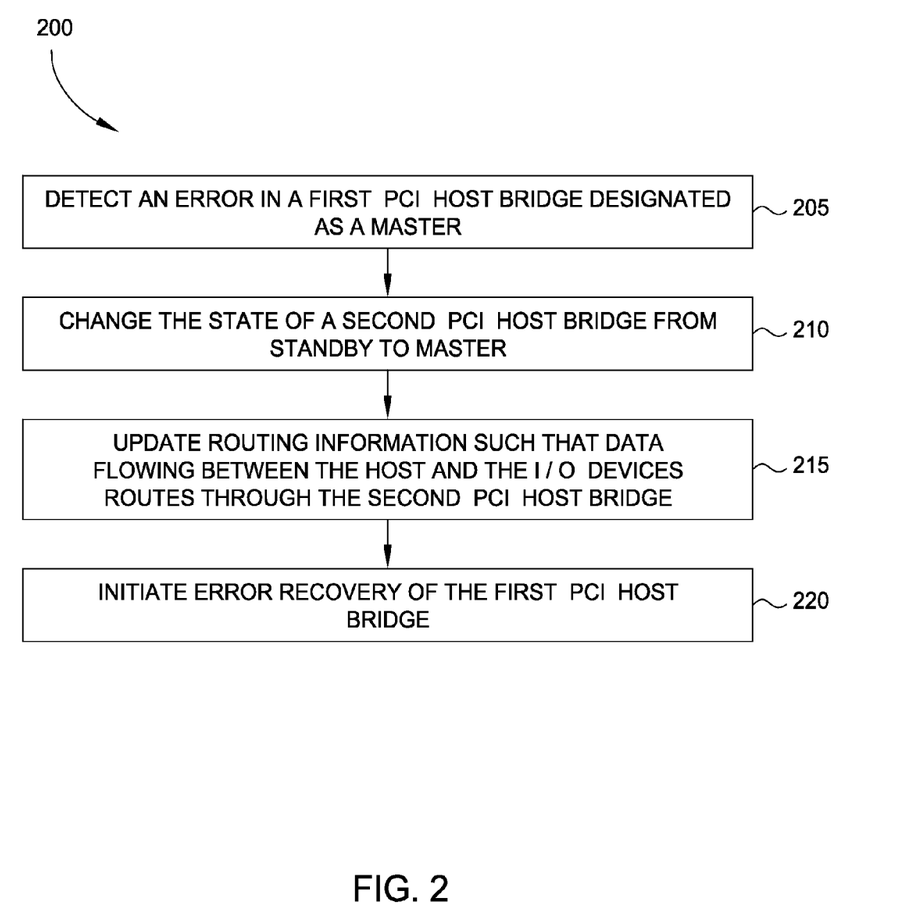
FIG. 2 is a flow chart for maintaining PCI communication when detecting an unrecoverable error in a PHB, according to one embodiment described herein.

FIG. 2 is a flow chart for maintaining PCI communication when detecting an unrecoverable error in a PHB, according to one embodiment described herein. Method 200 begins at block 205 when a first PHB experiences an error from which it cannot recover. For example, the first PHB may use error correction codes to determine that the data flowing through the PHB is becoming corrupted or that an internal memory array used to perform memory translation stores corrupt data. Another example of an unrecoverable error is when the data links between the PHB and the PCI switch are physically disconnected (e.g., severed). Generally, an unrecoverable error may be any error where the PHB is unable to continue to operate. The unrecoverable error may be detected by the PHB itself—e.g., an error monitoring module in the PHB's firmware—or by the hypervisor.

Upon detecting the unrecoverable error, the first PHB may be demoted from its master state. Referring to FIG. 1, the PHB 130 designated as master may be responsible for establishing a PCI communication link between the system resources of the host computing device 105 and the I/O devices 150. The other PHB 130, in contrast, may be designated as the servant PHB and is unused.

In addition to demoting the first PHB, at block 210 the hypervisor may promote the second PHB to the master. Specifically, the hypervisor may change state bits associated with the second PHB from a standby state to a master state. In response, the second PHB begins to facilitate data traffic between the host computing device and the I/O devices. Alternatively, instead of the hypervisor promoting the second PHB to the role of master, the first PHB may transmit a signal or interrupt directly to the second PHB instructing the second PHB to change its state to master.

In one embodiment, the hypervisor may perform fault isolation on the first PHB such that first PHB can no longer communicate with the system resources in the host computing device. Doing so prevents subsequent transactions from being sent or received on, for example, the ASIC interconnect bus communicatively coupling the first PHB to the system resources. In one embodiment, the first PHB may change its state from master to standby once the first PHB receives an acknowledgement signal back from the second PHB.

At block 215, the hypervisor may update routing information such that data flowing between the host computing device and the I/O devices routes through the second PHB. For example, the hypervisor may instruct the system resources in the host computing device to begin transmitting data messages intended for the I/O devices to the second PHB rather than the first PHB. In addition, the hypervisor may update the PCI switch to renumber the upstream buses and routing so that data traveling from the I/O devices is routed to the second PHB. Because the PCI switch knows the correct PHB, the hypervisor may be able to avoid reconfiguring the I/O devices directly.

As will be discussed in greater detail below, the first and second PHBs may be synchronized so that the standby PHB is able to assume the role as master as soon as the current master PHB experiences an unrecoverable error. In one embodiment, the host computing device may ensure that the first and second PHBs are configured in the similar manner—e.g., contain the same routing information—such that when one fails, the other has the necessary information for continuing to facilitate PCI communication between the host and the I/O devices. To the perspectives of the I/O devices and the system resources in the host computing device, they may not know that they are using a different PHB when one of PHBs fail and the other takes over. By keeping the first and second PHBs synchronized, switching from using the first PHB to using the second PHB may be substantially seamless. Once the PCI switch and the system resources are configured to communicate with the second PHB instead of the first PHB, the system may begin to use the second PHB to pass data between the I/O devices and the system resources.

At block 220, the first PHB begins the recovery process. In one embodiment, the recovery process involves resetting the hardware or firmware (or both) of the first PHB. The system may further isolate the first PHB by electrically disconnecting the first PHB from the downstream PCI switch and I/O devices. In some recovery techniques, resetting the PHB also resets the PCI switch and may even reset the I/O devices coupled to the switch. Because method 200 may maintain communication between the I/O devices and the system resources while the first PHB is resetting, it may be undesirable to permit resetting the first PHB to affect the I/O devices or PCI switch. Accordingly, disconnecting the first PHB from these devices ensures that resetting the first PHB does not disrupt the ability of the PCI switch and I/O device to use the redundant PCI link provided by the second PHB.

Resetting the first PHB may take several seconds to complete. During this time, the second PHB may continue to permit the host computing device and the I/O devices to exchange data. Once the reset is complete and the first PHB has recovered from the error, the hypervisor may restore the electrical connection between the first PHB and the PCI switch. Moreover, the hypervisor may continue to synchronize the first and second PHBs. Thus, if the second PHB experiences an unrecoverable error, the first PHB may be again promoted to master while the second PHB performs the recovery process.

In other embodiments, method 200 may be performed even if the PHB does not experience an unrecoverable error. For example, a user may wish to reset PHB to perform a software or firmware update. In another scenario, a system may have multiple processors that each couple to a respective PHB. When one of the processors is replaced, the hypervisor may use method 200 so that data destined to the removed processor is instead forwarded to the other PHB, and thus, to the processor remaining in the system. Generally, method 200 may be used if the user does not want to lose connectivity between the host computing device and the I/O devices when there are redundant PHBs.

Figure 3:
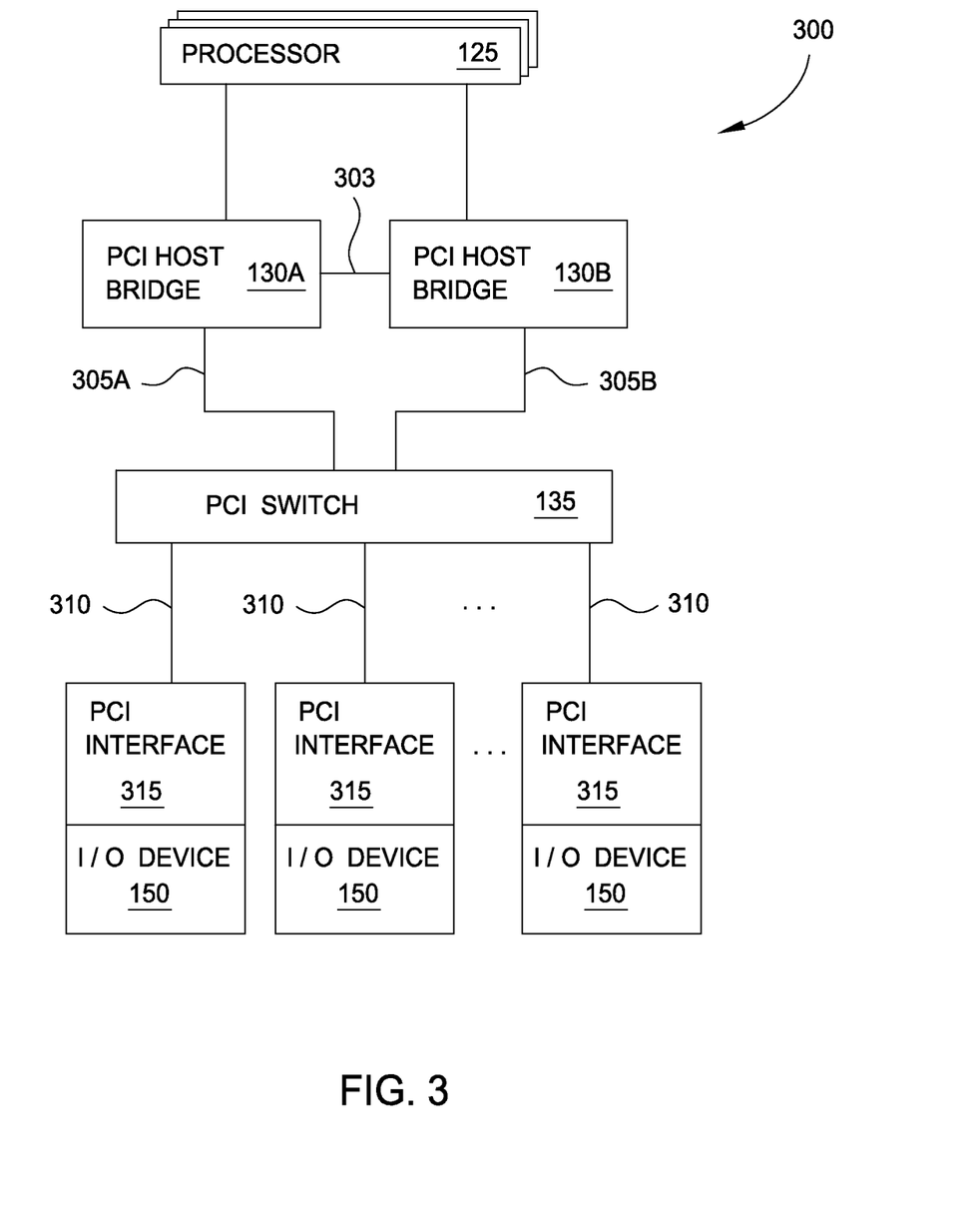
FIG. 3 illustrates a system diagram of a computing device with redundant PCI communication paths, according to one embodiment described herein.

FIG. 3 illustrates a system diagram of a computing device with redundant PCI communication paths, according to one embodiment described herein. System 300 includes one or more processors 125 coupled to the PHBs 130. Although shown as separate links, the PHBs 130 may be coupled to a shared internal bus which enables the PHB to receive and transfer data to the different system resources executing on the host computing device. The PHBs 130 may also be communicatively coupled using a direct link 303. This link 303 may enable the two PHBs 130 to maintain synchronization. For example, if the first PHB 130A updates an I/O page table (or I/O Translation Table), the PHB 130A may push out the update to the second PHB 130B. Thus, if the first PHB 130A fails and must be reset, the second PHB 130B is already configured with the same information as that found on PHB 130A. Moreover, the direct link 303 may also be used by the current master PHB to directly inform the standby PHB that it has failed and that the standby PHB should assume the role of master. The direct link 303 is not limited to any particular communication technique or protocol. For example, link 303 may use either serial or parallel communication to transfer data between PHB 130A and 130B. In one embodiment, the PHBs 130 may be separate ICs, or separate areas of a shared IC, that are integrated into a device package. Here, the direct link 303 may be a link in the package coupling the PHBs 130 together.

In other embodiments, instead of having a direct physical link 303, system 300 may synchronize the PHBs using the communication path between processor 125 and PHBs 130. For example, when the page table in PHB 130A is updated, the hypervisor (not shown) may push out the update using processor 125 to PHB 130B. That is, PHB 130A may inform the hypervisor that a configuration value has changed and, in turn, the hypervisor may relay the change to PHB 130B.

In system 300, both PHB 130A and PHB 130B have respective PCI links 305A-B to PCI switch 135. If PCI Express is the communication protocol used by system 300 the links 305 may include any number of PCI lanes (e.g., x1, x4, x16, x32, etc.). In one embodiment, system 300 may activate only the PCI link 305 that is associated with the PHB 130 that is currently designated as the master while the other PCI link 305 remains unused. In another embodiment, system 300 may include logic elements that permit the PHBs 130 to share the same PCI link rather than using separate physical links 305 as shown.

PCI switch 135 is coupled to both PHB 130A and PHB 130B via the PCI links 305. In one embodiment, the PCI switch 135 may be used to create multiple endpoints out of one physical endpoint (e.g., 110 device 150) to allow the association of one endpoint with multiple system resources (e.g., virtual machines or operating systems) executing within a host. PCI switch 135 receives instructions from the master PHB 130 and, using routing information, forwards the instructions to the correct I/O device 150. As discussed above, the hypervisor may configure PCI switch 135 to know which PHB 130 to use when transferring data from the I/O devices 150 to the processor 125. Thus, during a PHB failure, the PCI switch 135 can be reconfigured to forward traffic to the new master PHB.

System 300 includes a plurality of PCI interfaces 315—e.g., PCI slots—that provide a receptacle for the I/O devices 150. For example, the PCI interfaces 315 may be within a chassis of a host computing device or exposed at an outer surface of the chassis. Using interfaces 315, a system administrator may connect I/O devices to the host computing device.

Figure 4:
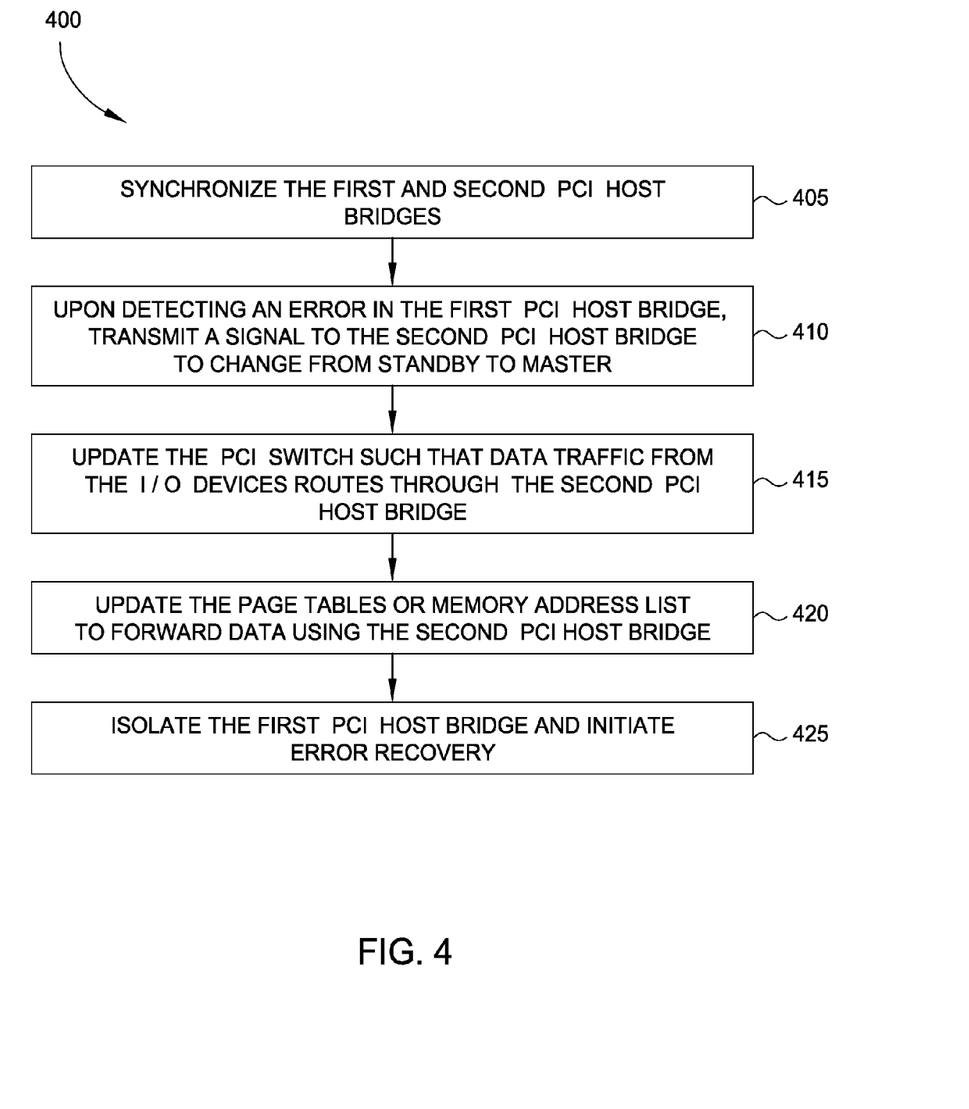
FIG. 4 is a flow chart for using redundant PCI communication paths when detecting an unrecoverable error in a PHB, according to one embodiment described herein.

FIG. 4 is a flow chart for using redundant PCI communication paths when detecting an unrecoverable error in a PHB, according to one embodiment described herein. Method 400 begins at block 405 where the first and second PHB are synchronized. This synchronization may occur before or after the first PHB (i.e., the master PHB) experiences an unrecoverable error. Moreover, the first and second PHBs may be synchronized directly (using a direct link) or indirectly (using the hypervisor). Generally, each change made to the settings or routing information in the master PHB may be mirrored to the servant PHB. In this manner, the first and second PHBs may be programmed identically. It may be advantageous for this synchronization process to happen continually or constantly (e.g., at predefined intervals or every time a setting is changed) so that the servant PHB is always ready to assume the role as master. Alternatively, it may be advantageous to delay synchronizing the first and second PHBs until the master experiences an unrecoverable error since this delays having to send synchronization data until the master PHB fails.

Upon detecting an error, the first PHB or the hypervisor may transmit a signal to the second PHB instructing the second PHB to assume the role of master. Specifically, the signal may instruct the second PHB to change its state bits from a standby state to a master state. In response, the second PHB begins to facilitate data traffic between the host computing device and the I/O devices. In one embodiment, when experiencing an unrecoverable error, the first PHB uses the direct link 303 shown in FIG. 3 to transmit the signal to the second PHB. In addition, the hypervisor may perform fault isolation on the first PHB such that first PHB can no longer communicate with the system resources in the host computing device. Doing so prevents subsequent transactions from being sent or received on, for example, the bus which enables the first PHB to communicate with the system resources in the host computing device. In one embodiment, the first PHB may change its state from master to standby once the first PHB receives an acknowledgement signal back from the second PHB via, for example, the direct link.

At block 415, the hypervisor may update routing information on the PCI switch such that data flowing from the I/O devices to the system resources of the host computing device routes through the second PHB. For example, the hypervisor may update the PCI switch to renumber the upstream buses and routing so that data traveling from the I/O devices flows to the second PHB. Because the PCI switch knows the correct PHB, the hypervisor may be able to avoid reconfiguring the I/O devices directly.

At block 420, the hypervisor may update the page tables or a memory address list to forward data using the second PHB. If the I/O page tables (which may be stored in system memory, e.g., memory 110 of FIG. 1) are changed, the hypervisor may reroute the physical address maps such that the maps point to the second PHB rather than the first PHB. Alternatively, the hypervisor may update the memory address list stored on the second PHB to reflect that the second PHB now is responsible for the same memory addresses as that of the first PHB. Thus, in this example, method 400 may not mirror the exact same settings from the first PHB to the second PHB. Instead, the memory address lists may be maintained separately until the first PHB fails. In response, the hypervisor may complete the synchronization process by storing the memory address list of the first PHB into the second PHB. By changing the memory address lists, the page tables can remain unchanged. Once the upstream and downstream devices have been configured to route data through the second PHB, the second PHB can be used to maintain the flow of data between the I/O devices and the host computing device.

Although the handoff of the responsibilities between the master PHB and the servant PHB may occur almost instantly, there still may be some data loss. For example, data that is currently being handled by the master PHB when an unrecoverable error occurs may be dropped. In one embodiment, the PCI switch may have a replay function that permits the switch to replay transient data (i.e., data that is currently flowing between the I/O devices and the first and second PHBs). The replay feature of the PCI switch may be useful where in-flight or pending data (i.e., data that has not yet reached its ultimate destination) is lost or dropped when the first PHB experiences an unrecoverable error. Specifically, the PCI switch may be processing in-flight data intended for the first PHB when the first PHB experiences the error. Before the second PHB assumes the role of master, some of the in-flight data may be dropped. The hypervisor or the second PHB may initiate the replay feature of the PCI switch so that the in-flight or pending is retransmitted to the second PHB which is then able to forward the data to the correct system resource.

At block 425, the first PHB begins the recovery process. In one embodiment, the recovery process involves resetting the hardware or firmware (or both) of the first PHB. The system may further isolate the first PHB by electrically disconnecting the first PHB from the downstream PCI switch and I/O devices. In some recovery techniques, resetting the PHB also resets the PCI switch and may even reset the I/O devices coupled to the switch. Because method 400 may maintain communication between the I/O devices and the system resources while the first PHB is resetting, it may be undesirable to permit resetting the first PHB to affect the I/O devices or PCI switch. Accordingly, disconnecting the first PHB from these devices ensures that resetting the first PHB does no disrupt the ability of the PCI switch and the I/O device to use the redundant PCI link provided by the second PHB.

Resetting the first PHB may take several seconds to complete. During this time, the second PHB may continue to permit the host computing device and the I/O devices to exchange data. Once the reset is complete and the first PHB has recovered from the error, the hypervisor may restore the electrical connection between the first PHB and the PCI switch. Moreover, the hypervisor may continue to synchronize the first and second PHBs. Thus, if the second PHB experiences a unrecoverable error, the first PHB may be again promoted to master while the second PHB performs the recovery process.

In other embodiments, method 400 may be performed even if the PHB does not experience an unrecoverable error. For example, a user may wish to reset PHB to perform a software or firmware update. If the user does not want to lose connectivity between the host computing device and the I/O devices when the PHB is reset during the update, method 400 may be used.

CONCLUSION

Instead of disabling PCI communication between system resources in a host computing device and I/O devices, the host computing device may include a redundant PCI communication path for maintaining communication between the system resources and the I/O devices after a first PHB experiences an unrecoverable error. In one embodiment, the redundant PCI communication path includes a second PHB that is maintained in a standby state so long as the first PHB is functioning normally. However, once the first PHB experiences an unrecoverable error, the second PHB is changed to the master state and assumes the responsibility for maintaining communication between the system resources and the I/O devices.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer program product comprising:
   a computer-readable storage medium having computer-readable program code embodied therewith, the computer-readable program code comprising computer-readable program code configured to:
   synchronize a first peripheral component interconnect host bridge (PHB) to a second PHB such that settings of the first PHB are mirrored onto the second PHB, wherein the first PHB is configured to facilitate peripheral component interconnect (PCI) communication between a host and an input/output (I/O) device;
   detect an event on the first PHB indicating that the functionality of the first PHB is inhibited;
   after detecting the event, change a state of the second PHB from a standby state to a master state, wherein the second PHB is configured to facilitate PCI communication between the host and the I/O device when in the master state and is not used to facilitate communication between the host and the I/O device when in the standby state;
   reset the first PHB; and
   after detecting the event, change a state of the first PHB from the master state to the standby state so the first PHB is not used to facilitate communication between the host and the I/O device.

2. The computer program product of claim 1, wherein the second PHB facilitates PCI communication between the host and the I/O device while the first PHB is resetting.

3. The computer program product of claim 1, wherein synchronizing the first PHB to the second PHB further comprises computer code configure to:
   transfer changes made to routing information stored in the first PHB to the second PHB, wherein the second PHB is configured substantially identically to the first PHB.

4. The computer program product of claim 3, wherein the routing information is transferred using a direct, physical communication link coupling the first PHB to the second PHB.

5. The computer program product of claim 1, further comprising computer code configured to, before resetting the first PHB, isolate the first PHB from the I/O device such that first PHB is unable to communicate with the I/O device while being reset.

6. The computer program product of claim 1, further comprising computer code configured to, after detecting the event, update routing information stored in a PCI switch coupled between the first and second PHBs and the I/O device such that the PCI switch forwards data received from the I/O device to the second PHB instead of the first PHB.

7. The computer program product of claim 1, wherein the second PHB is not used for transmitting data between the host and the I/O device while the first PHB is in the master state.

8. A computing system, comprising:
   a computer processor;
   a first peripheral component interconnect host bridge (PHB) configured to facilitate peripheral component interconnect (PCI) communication between the processor and an input/output (I/O) device, wherein the first PHB is configured to reset after detecting an indication that the functionality of the first PHB is inhibited;
   a second PHB configured to, after receiving notification that the first PHB is unable to function, change from a standby state to a master state, wherein the second PHB is configured to facilitate PCI communication between the I/O device and the processor when in the master state and is not used to facilitate communication between the host and the I/O device when in the standby state; and
   a communication path between the first and second PHBs for synchronizing the first PHB to the second PHB such that settings of the first PHB are mirrored onto the second PHB so the first PHB is not used to facilitate communication between the host and the I/O device.

9. The system of claim 8, wherein the second PHB facilitates PCI communication between the host and the I/O device while the first PHB is resetting.

10. The system of claim 8, wherein synchronizing the first PHB to the second PHB further comprises:
    transferring changes made to routing information stored in the first PHB to the second PHB, wherein the second PHB is configured substantially identically to the first PHB.

11. The system of claim 8, wherein the communication path comprises a direct, physical communication link coupling the first PHB to the second PHB.

12. The system of claim 8, further comprising a PCI switch coupled between the first and the second PHBs and the I/O device logic configured to forward data received from the I/O device to the second PHB instead of the first PHB after detecting the indication that the functionality of the first PHB is inhibited.

13. The system of claim 12, further comprising a first PCI link between the first PHB and the PCI switch and a second, separate PCI link between the second PHB and the PCI switch.

* * * * *